July 24, 1962 B. W. LEE 3,046,493

TRANSISTOR MULTIVIBRATOR CIRCUIT

Filed Aug. 27, 1958

INVENTOR
B. W. LEE
BY Harold C. Herman
ATTORNEY

United States Patent Office 3,046,493
Patented July 24, 1962

3,046,493

TRANSISTOR MULTIVIBRATOR CIRCUIT

Bock W. Lee, Berkeley, Calif., assignor to Bell Telephone Laboratories, Incorporated, New York, N.Y., a corporation of New York Filed Aug. 27, 1958, Ser. No. 757,622
9 Claims. (Cl. 331—111)

This invention relates to pulse generating circuits and more particularly to astable transistorized multivibrator circuits utilized as pulse generators.

Requirements imposed upon electronic pulse generating circuits since the advent of automation have continuously stressed a high degree of reliability and stability of performance. Such stringent requirements have been necessitated as these circuits must render service for long unattended periods and over wide ranges of ambient and circuit conditions to provide necessary timing pulses to operational equipment. Insofar as pulse generators used in most automatic systems are concerned, the most important performance characteristic of these circuits is the pulse repetition frequency. Pulse repetition frequency is of particular importance in that the pulse generator is very often employed to develop a time base used as a basis for timing pulses employed therein. Accordingly, variations in pulse repetition frequency would result in a variation of this time base to affect an improper timing of many circuits and, in some cases, an improper operation of the complete system. Other performance characteristics, such as output pulse duration and output pulse amplitude, are relatively unimportant except for any effect which they might have on the over-all performance of the automatic system.

Transistor devices have found usage in automatic systems in a wide range of applications. The reasons for the rapid adoption of transistor devices are many, e.g. smallness of size, low total power drain, etc. There are many examples in the present art wherein transistor devices have been employed in astable circuits to generate a time base for timing pulses. However, the present state of development of the transistor devices per se has not solved one basic problem encountered in the use thereof in astable circuits. This disadvantage is due to an inherent property of transistors whereby certain parameters thereof are affected by ambient temperatures. An increase or decrease in temperature causes several major changes in transistor parameters or properties which have a very definite bearing upon circuit reliability and stability. The first of these changes is that the current amplification factor or alpha of the transistor is directly affected by temperature variation. Another of these changes is that the leakage current or the direct-current collector current for zero emitter current increases exponentially with increases in temperature. From this latter, it follows that the effective resistance of the base-collector circuit varies inversely with increases of temperature so as to cause a variation of emitter leakage current.

An astable multivibrator circuit is one which is arranged to be free-running or self-oscillating at a predetermined frequency. Fundamentally, such circuit may be considered as having two unstable states of operation, each of these unstable states of operation being of a predetermined duration, and so arranged that a termination of one state of operation causes an automatic transfer to the other state of operation. A capacitor is normally employed as the control or timing element for determining the duration of the two states of operation of the astable circuit. In prior astable multivibrator circuits of this type, the effect of this control or timing capacitor was very often conditioned by changes in transistor parameters due to extraneous causes. Such conditioning of the control or timing capacitor is particularly undesirable where a pulse frequency or a time base for automatic systems is to be maintained constant over long periods of unattended operation during which ambient temperatures may vary anywhere between 40 and 50 degrees on a centigrade scale, e.g. in certain installations which are directly subjected to weather conditions. As the duration of operation of the astable circuit in each of the unstable states of operation is determined by the charging and discharging of the control or timing capacitor, it is evident that ambient temperatures affecting as they do transistor parameters will affect through the transistor device the charge and discharge time constant of the control or timing capacitor. The effect of ambient temperatures upon the charge and discharge time constant of the capacitor results in a variation of the time required for a complete duty cycle or frequency of operation of the astable circuit. It has heretofore been necessary to provide variable resistors and other circuit components to prevent what may be termed a temperature drift of output frequency. Such measures require direct supervision for maintaining the stability and reliability of the astable circuit and necessitate the use of a greater number of circuit components.

The interpulse interval, i.e. the time interval between successive output pulses, often constitutes the larger portion of the complete duty cycle of the astable circuit. A stabilizing of this performance feature of an astable circuit will have a great influence upon the stabilization of the pulse repetition frequency or duty cycle of the astable circuit. In many applications wherein astable circuits are employed, the interpulse interval may constitute as much as 97 percent of the duty cycle. If the interpulse interval in such applications is positively fixed or determined independently of variations in transistor parameters, the duty cycle of the astable circuit is affected only to the extent to which the output pulse duration is changed by the variation in transistor parameters. A percentage increase or decrease in output pulse duration only results in a correspondingly small over-all percentage increase in the time required for a complete duty cycle of the astable circuit if the interpulse interval is stabilized. By limiting the variation of the duty cycle of the astable circuit only to those changes in the output pulse duration and making the interpulse interval independent of the effects of ambient temperatures, the circuit operates within closer and more tolerable limits under all conditions of ambient temperature than has been heretofore available.

Accordingly, it is an object of this invention to provide a new and improved astable transistor multivibrator.

Another object of this invention is to provide an astable transistor multivibrator having a duty cycle which can be maintained within closer and more tolerable limits during long periods of unattended operation.

A further object of this invention is to provide an astable transistor multivibrator having a duty cycle which is relatively independent of changes in transistor parameters and, more specifically, is relatively independent of ambient temperatures or fluctations in the voltage supplied thereto.

Briefly, the invention contemplates the attainment of the above-enumerated objects by the provision of a discharging path for the control or current limiting capacitor in an astable transistor multivibrator circuit which is essentially distinct from the charging path thereof and isolated from transistor and circuit parameters during the discharge cycle of the capacitor so as to be unaffected by variations therein due to external factors. Accordingly, two junction transistors of opposite conductivity types are cross-coupled in such a manner so as to effect regeneration therebetween and be productive of an equivalent transistor device having an effective alpha greater than unity. The control capacitor is connected in the emitter circuit of one of the transistors through a unilateral conducting device which is poled in the direction of positive emitter current. The control capacitor is thereby operative to determine the regeneration cycle by controlling the current flow in the one transistor. At the end of the regeneration cycle, a voltage has been developed across the control capacitor which is sufficient to reverse bias both the unilateral conducting device and the emitter-base circuit of the one transistor. The reverse impedance of the unilateral conducting device is such as to effectively isolate the now charged control capacitor from the equivalent transistor device so that the discharge cycle thereof is unaffected by variation in the transistor parameters. The discharge of the control capacitor, accordingly, takes place in bypass of most of the astable circuit to a point where the unilateral conducting device and the emitter-base circuit of the one transistor become forward biased to again initiate regeneration and drive the equivalent transistor device to saturation. Accordingly, the control capacitor times both the pulse duration and the interpulse interval but is effectively isolated from variations in transistor parameters during the latter by the unilateral conducting device.

An independence of interpulse interval and interpulse duration on the supply of voltage is obtained by providing that the transistor associated with the control capacitor becomes forward biased at the same fraction of the discharge time constant rather than upon the discharge to a critical voltage of the control capacitor. This result is achieved by providing that the voltages supplied to the interpulse timing network and to the base electrode of the one transistor associated with the control capacitor are caused to track or vary equal percentages. Accordingly, each of these voltages is derived from a single voltage source. Operational voltages are supplied directly to the interpulse timing network from the single voltage source. A voltage divider network is connected between the single voltage source and ground which includes a first voltage divider employed to supply operational voltages to the base electrode of the transistor associated with the control capacitor. A second voltage divider is provided to avoid applying reverse polarity voltages across the control capacitor. Since the discharge time constant of the control capacitor is fixed, a variation in the voltage supplied to the interpulse timing circuit results in a corresponding percentage variation in the voltage supplied to the base electrode of the one transistor associated with the control capacitor to insure that this transistor becomes forward biased at a predetermined fraction of the discharge time constant.

A feature of this invention relates to the provision of an interpulse timing network placed in relation to the regenerative loop of an astable circuit such that the interpulse interval is determined while the interpulse timing network is isolated from circuit parameters.

Still another feature of this invention relates to the provision of a voltage supply circuit whereby the voltage supplied to the interpulse timing network and the equivalent single transistor device vary equal percentage amounts so as to insure termination of the interpulse interval at the same fraction of the time constant of the interpulse timing network.

A further feature of this invention relates to the provision of a unilateral conducting device interposed between an astable transistor device and an associated timing network and so disposed as to present a high impedance therebetween during the low conduction state of operation of the transistor device.

The foregoing objects and features of applicant's invention will become more apparent to one skilled in the art from the detailed description of the specific embodiment when considered with the drawing in which.

Figure 1:
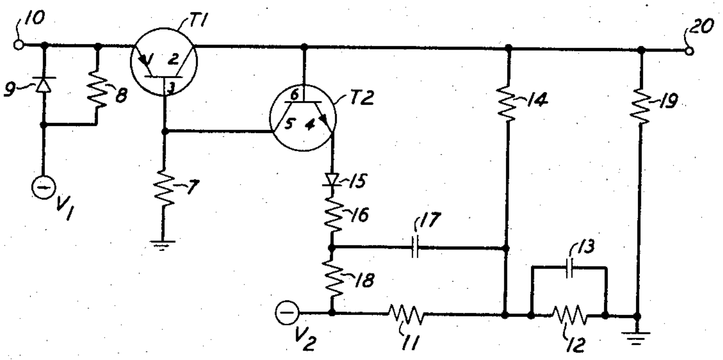
FIG. 1 is a circuit diagram of an astable multivibrator circuit utilizing a pair of opposite conductivity type transistors and embodying the present invention.

Referring to FIG. 1 two junction transistors T1 and T2 are shown in a cross-coupled arrangement which is adapted for astable operation. The transistors T1 and T2 are shown as p-n-p and n-p-n types, respectively, having associated therewith conventional electrodes. The electrodes of transistor T1 are depicted as emitter electrode 1, collector electrode 2 and base electrode 3, and the electrodes of transistor T2 are depicted as emitter electrode 4, collector electrode 5 and the base electrode 6. While transistors T1 and T2 are shown as being of certain conductivity types, it is evident that the conductivity types may each be reversed if the biasing potentials hereinafter to be described are similarly reversed. The cross-coupling arrangement of transistors T1 and T2 are such that the collector electrode 2 of transistor T1 is connected to the base electrode 6 of transistor T2 while the collector electrode 5 of transistor T2 is connected to the base electrode 3 of transistor T1. The junction of base electrode 3 and the collector electrode 5 is connected to ground through the resistor 7. The resistor 7 is arranged within the circuit to act as a feedback promoting element to provide the arrangement of transistors T1 and T2 with a negative resistance input characteristic. This negative resistance input characteristic results from the cross-coupled arrangement of the transistors T1 and T2 and the fact that they are of opposite conductivity types. The interaction of the transistors T1 and T2 to produce this effect with the resistor 7 will be more fully described hereinafter.

A biasing voltage source $V_1$ is connected to the emitter electrode 1 through a parallel arrangement consisting of resistor 8 and diode 9. Diode 9 is poled in the direction of positive emitter current through the transistor T1 and is effective to provide a low impedance circuit for forward currents upon conduction in transistor T1. Resistor 8 serves to maintain the emitter electrode 1 at a fixed potential during the "off" or low conduction operation of the astable circuit as diode 9 is effectively an open circuit at this time. The voltage source $V_1$, which is of a negative polarity, tends to maintain the transistor T1 in a normally reverse biased condition as the base electrode 3 is normally maintained at ground potential due to the connection thereof to ground through the resistor 7. While the cross-coupled arrangement has a free-running or astable operation, an input terminal 10 is connected to the emitter electrode 1 and is adapted to receive synchronizing or keying pulses if required.

An external circuit arrangement is shown connecting the emitter electrode 4 to the base electrode 6 of transistor T2. Operating potentials are provided to this external circuit from the voltage source $V_2$. The voltage source $V_2$ is connected to ground through the resistors 11 and 12 which are serially arranged as a voltage dividing network. A capacitor 13 is connected in parallel with the resistor 12 and is of sufficient magnitude to maintain a constant potential at the junction of the resistors 11 and 12. Accordingly, a voltage tap from the junction of resistors 11 and 12 may be considered as an additional voltage source distinct from the voltage source $V_2$ for supplying operational potentials to the base electrode 6 and the collector electrode 2. The circuit so far described would also be operative if a separate voltage source were used to supply operational potentials to the collector electrode 2 and the base electrode 6. Such voltage source should be of a smaller magnitude than the source $V_2$ as will hereinafter become apparent. The junction of resistors 11 and 12 is connected to the junction of collector electrode 2 and base electrode 6 through a resistor 14. The junction of resistors 11 and 12 is also connected to the emitter electrode 4 of transistor T2 through a diode 15 and a resistor 16 which are serially arranged with a capacitor 17. The voltage source $V_2$ is connected to the junction of resistor 16 and capacitor 17 through a resistor 18. A resistor 19 is connected between the base electrode 6 of transistor T2 and ground, and an output terminal 20 is connected to the junction of the load resistor 14 and the base electrode 6 of transistor T2 for directing the output pulses to subsequently arranged utilization devices.

As described above and in accordance with an aspect of my invetnion, the negative potential from the voltage source $V_2$ is supplied to the collector electrode 2 of transistor T1 and the base electrode 6 of transistor T2 across two voltage dividing arrangements. The first voltage dividing arrangement has been described as including resistors 11 and 12 and allows for an equal percentage variation of the two operational voltages necessary for proper circuit operation. The second voltage dividing arrangement consisting of resistors 14 and 19 which is employed to provide operational potentials to the collector electrode 2 and the base electrode 6 is connected from the junction of resistors 11 and 12 to ground. The resistor 19 should be large as compared to the resistor 14 so that the potential at the base electrode 6 is only slightly less negative than the potential which is provided from the junction of resistors 11 and 12. The employement of resistor 19 insures that the potential at the emitter electrode 4 becomes more negative than the potential at the base electrode 6 when the capacitor 17 is discharged. The transistor T2 is, therefore, maintained in a forward biased condition during that time in which the capacitor 17 is uncharged or charging. The arrangement has an operation which is astable or free-running. The "on" and "off" conditions, or the high conduction and the low conduction states of operation, respectively, are determined by the effect of capacitor 17 upon the transistor T2.

It is evident that the series circuit which includes the diode 15, the resistor 16 and the capacitor 17 are in the emitter current path of transistor T2. The capacitor 17 operates as a current limiting or control capacitor to decrease the emitter current flow of transistor T2 with time so as to determine its operating condition. Fundamentally, the arrangement so far described may be considered as a common base circuit which is provided with regeneration or positive feedback. The active element of the circuit arrangement is the transistor T1 while the positive feedback is provided by the resistor 7 and the transistor T2 as controlled by the capacitor 17.

Even though transistor T1 is in a reverse biased condition, there is a small amount of current flowing from the collector electrode 2. This current is termed a leakage current or $I_{co}$ and results from the surface condition of the emitter-base junction and is affected by temperature. For the proper operation of the astable circuit, it is necessary that there be some current flow from the collector 2. This current flow may also be initiated by the application of a synchronizing pulse at the emitter electrode 1. Assuming that a synchronizing pulse is applied or that the collector current is increasing, the collector current from the collector electrode 2 is directed to a parallel arrangement which includes, in one leg, the emitter-base junction of transistor T2 in series with diode 15, resistor 16 and capacitor 17 and, in the other leg, resistor 14. The effect of the voltage source $V_2$ and resistor 18 may be disregarded for the discussion of this phase of the operation of the astable circuit since they are effectively bypassed by the capacitor 17. The portion of this collector current which is directed to the base electrode 6 and amplified by the transistor T2 is determined by the ratio of the impedances in each of the above-described legs of the parallel arrangement.

Initially, the capacitor 17 when uncharged appears as a short circuit to a current change so that the impedance of the leg including capacitor 17 will be at a minimum and the transistor T2 will conduct heavily. As the capacitor 17 charges, the amount of conduction in transistor T2 will, accordingly, decrease as the potential at the emitter electrode 4 becomes less negative with respect to the potential at the base electrode 6. Conduction in transistor T2 is productive of a current flow from ground through the resistor 7 to the collector electrode 5. This collector current flow to transistor T2 will produce a negative voltage drop across the resistor 7. This negative voltage drop across resistor 7 will tend to further forward bias the emitter-base junction of transistor T1 to increase the collector current flow therein. This collector current flows from ground through the resistor 7 and the base-collector circuit of transistor T1 and is effective to further increase the negative voltage drop across the resistor 7. Due to the transistors T1 and T2 being of opposite conductivity types, the currents flowing through the resistor 7 due to the conduction in each are in the same direction and the voltage drops developed thereby are additive. This results in a positive feedback or regenerative operation to drive both transistors to saturation. As the transistor T2 is arranged in a common emitter configuration, amplification of the current injected into the base electrode 6 occurs. The current amplification or beta of such common emitter configuration may be of the order of 40 so that the current through resistor 7 due to the conduction in transistor T2 is large and effective to produce a sufficient voltage drop across the resistor 7 to forward bias the transistor T1. Therefore, the necessary gain in the regenerative loop is provided by the transistor T2.

Upon the initiation of conduction in the transistor T2, the emitter current flows from the emitter electrode 4 through the diode 15 and resistor 16 to the junction of resistors 11 and 12 through the capacitor 17. This emitter current decays exponentially with time because of the charge which is developed thereby across the capacitor 17. The capacitor 17 charges to a voltage which is sufficient to bias transistor T2 to a point where the regeneration is insufficient to maintain the transistors T1 and T2 at saturation. The charge time constant for the capacitor 17 is determined by the forward impedance of the emitter-base circuit of transistor T2 in series with the forward impedance of diode 15 and the resistor 16. The charge time constant for the capacitor 17 is also determined by the current amplification factor or alpha of transistors T1 and T2 since they affect the amount of current flow through the emitter electrode 4. As was described above, the transistor T1 is a junction-type transistor which inherently has an alpha or a current multiplication factor less than unity and, therefore, cannot be self-maintained in a high conduction state when the transistor T2 is out of saturation. It is evident that the "on" and "off" conditions of the astable circuit is determined by the positive feedback or regeneration current as controlled by capacitor 17 through the agency of the transistor T2.

When the circuit arrangement reverts to its "off" condition, the potential of the base electrode 6 becomes more negative and approaches the value determined by the voltage dividing arrangement consisting of resistors 14 and 19. Such increase in the base potential of transistor T2 is effective to apply a large reverse biasing potential across the emitter-base junction as the capacitor is still charged at a less negative potential. It is evident due to the relationship of diode 15 with respect to the emitter-base junction of transistor T2 that it will likewise be reverse biased. Two discharge paths are now provided for the capacitor 17. One discharge path includes the resistor 16 in series with the back impedance of the diode 15, the back impedance of the emitter-base circuit of transistor T2 and resistor 14. The other discharge circuit is to the voltage source $V_2$ through the resistor 18. The impedance offered to the discharge current by the resistor 18 is very small compared to that offered by the other discharge path and is, therefore, determinative of the discharge time constant of the capacitor 17. Moreover, as the impedance presented by the reverse biased diode 15 is singly large as compared to the impedance of the resistor 18, the capacitor 17 is effectively isolated from any variation of parameters in transistors T1 and T2 during the time the transistor T2 is reverse biased and the astable circuit is in a low conduction state.

Figure 2:
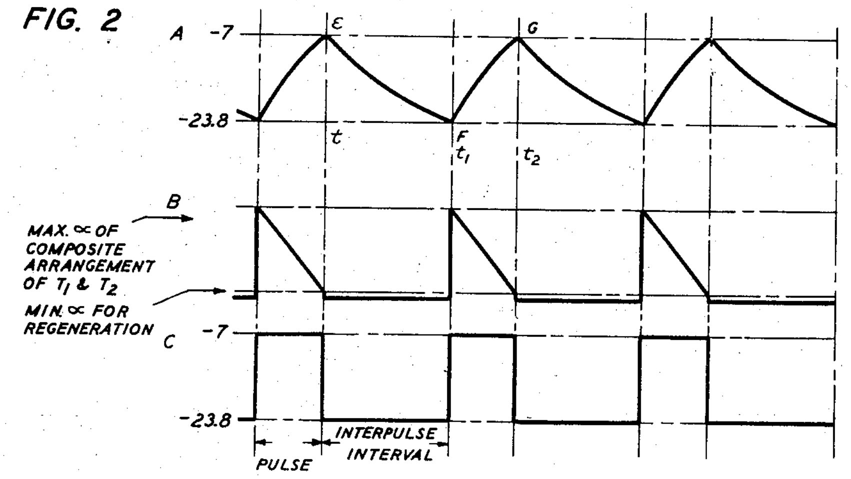
FIG. 2 shows curves useful in explaining the operation of the astable multivibrator circuit of FIG. 1.

A consideration of the three curves shown in FIG. 2 will aid in the understanding of the astable operation. Curve A graphically shows the charging and discharging cycles of the capacitor 17. Curve B graphically describes the variation of the effective alpha of the composite arrangement which includes the transistors T1 and T2. Curve C shows the output pulses developed at terminal 20 by the operation of transistor T1. To follow through the operation of the circuit arrangement, consider that the voltage source $V_2$ is of the order of 48 volts and the resistors 11 and 12 are of equal magnitude. Starting from the time $t$ when the emitter electrode 4 of transistor T2 has just become reverse biased, the astable circuit is in an "off" or low conduction state and the capacitor 17 has acquired a charge of approximately −7 volts. The voltage at the base electrode 6 is determined by the voltage dividing arrangement of resistors 14 and 19 and is of the order of −23.8 volts. Accordingly, both the emitter-base junction of transistor T2 and the diode 15 are reverse biased due to the charge of capacitor 17 and the potential applied to the base electrode 6. The increase in the negative potential at the base electrode 6 insures that the transistor T2 remains in a reverse biased condition and will not be forward biased until the capacitor 17 has discharged to the same level. Under the above-described conditions, the emitter-base circuit of transistor T2 is reverse biased by apporixately 16.8 volts. The capacitor 17 will thereupon begin to discharge to the voltage level set by voltage source $V_2$ through the resistor 18. The discharge time constant or the interpulse interval is determined by the values of the capacitor 17 and the resistor 18. From the description above, the voltage source $V_2$ is of a greater negative potential than the potential applied to the base electrode 6. Accordingly, as the capacitor 17 discharges to the level of the voltage source $V_2$, it approaches a value which is slightly more negative than the voltage applied to the base electrode 6. This discharge of capacitor 17 is depicted in curve A as the segment EF occurring during the time interval $t-t_1$. The diode 15 during the time interval $t-t_2$ remains reverse biased to effectively isolate the capacitor 17 from the parameters of transistors T1 and T2 so that the discharge time constant is effectively determined only by the resistor 18. At the time $t_1$, the capacitor 17 has discharged to approximately −23.8 volts and the diode 15 thereupon becomes forward biased. During this time, the transistor T1 is reverse biased and there is no current flow therein except for leakage currents. The portion of this leakage current which is injected into the base electrode 6 is not sufficient to cause transistor T2 to conduct. The larger portion is directed to the leg of the parallel arrangement including resistor 14 as the impedance offered by the leg including the emitter-base junction of transistor T2 and diode 15 is very great since each is reverse biased. However, upon the capacitor 17 having discharged to −23.8 volts, the transistor T2 becomes forward biased and leakage currents from transistor T1 are amplified thereby to initiate regeneration. During the conduction or "on" state of the astable circuit, the potential of the base electrode 6 drops to approximately −7 volts and the capacitor charges exponentially to this value. This is shown in curve A as that portion of the curve FG between the time interval $t_1-t_2$. At the point G, the capacitor 17 has again accumulated sufficient charge to reverse bias the emitter-base junction of transistor T2 and diode 15 and the sequence is again repeated.

The transistors T1 and T2 have been described as being of the junction type and so inherently possess an alpha or current amplification factor which is less than unity. Accordingly, such transistors are unsuitable for use singly in multivibrator circuits. However, the arrangement above described due to the provision of positive feedback or regeneration provides the cross-coupled or composite arrangement of transistors T1 and T2 with negative resistance characteristics. As was described above, this negative resistance characteristic is attributable to resistor 7 and is the result of the cross-coupled arrangement of transistors T1 and T2. Curve B shows the variation of the effective alpha of the composite arrangement of transistors T1 and T2. During the time interval $t-t_1$, the composite alpha is not sufficient to support regeneration and is determined by the alpha of the transistor T1. However, at the time $t_1$ when the transistor T2 has become forward biased, maximum current is injected into the base electrode 6 from the transistor T1 and amplified by transistor T2. This results from the fact that a minimum impedance is presented to the emitter current of transistor T2 due to the capacitor 17 being in an uncharged state. However, as the capacitor 17 charges, the voltage at the emitter electrode 4 becomes less negative and conduction in transistor T2 is reduced. Curve B shows that at the time $t_1$ the composite alpha of the transistor arrangement increases almost vertically due to this condition. A comparison of curves A and B shows that as the capacitor charges along the curve FG and less negatively biases the emitter electrode 4, the effective alpha of the composite arrangement decreases and, at the time $t_2$, is not sufficient to support regeneration. It is, therefore, necessary that the transistor T2 be forward biased and conducting in order for the astable circuit to operate in a high conduction state. A consideration of the curve C shows that output pulses are only developed during that time in which the capacitor 17 is charging and the effective alpha of the composite arrangement is sufficient to support regeneration.

Figure 3:
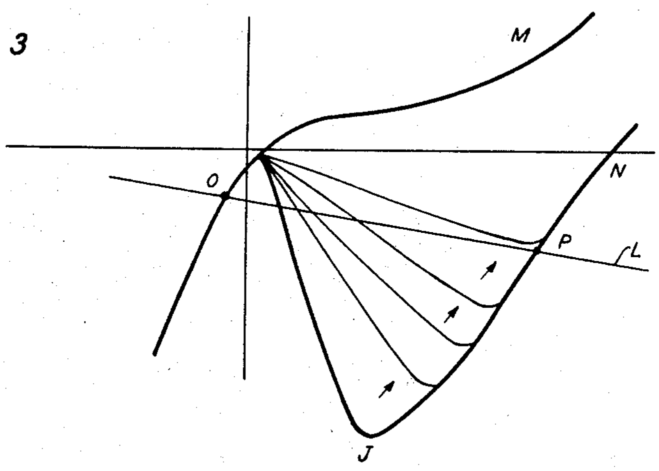
FIG. 3 is a diagrammatic representation of the negative resistance characteristic curve and the load line of the circuit of FIG. 1 which illustrates the effect thereon of a variation in the effective alpha of the single equivalent transistor device.

The effect of the positive feedback or regeneration is graphically brought out in FIG. 3. FIG. 3 shows the characteristic curves of the circuit. Curve M shows a typical characteristic curve for a junction transistor. The curve M throughout has only a positive resistance but is modified due to the positive feedback arrangement and the effect of resistor 7. It is evident that the amount of current through resistor 7 is dependent upon the alpha of both the transistors T1 and T2. The modification of curve M results in the establishment of a negative resistance region as shown by the curve N. This curve is similar to the typical N-shaped curve of a transistor having an alpha greater than one and adapted for regeneration. The effective alpha of the composite circuit arrangement determines the valley point J which is defined as a maximum negative excursion of the voltage on the emitter electrode. The slope of the negative resistance of the curve N is a function of the effective alpha of the composite arrangement and is directly related thereto. Variations in the effective alpha of the composite arrangement vary the output pulse duration. If one were to consider that the load line L intersects the curves M and N at the point O, only one operating point is provided for the composite arrangement. However, upon regeneration, the valley point is established at point J and the load line L intersects the high current positive resistance portion of the curve N at the point P. The location of point J is determined by the effective alpha of the composite arrangement. As the capacitor 17 charges and the effective alpha of the composite arrangement decreases, the valley point will move upward from point J along the high current positive resistance portion of the curve N in the direction of the arrows. The duration of the output pulse is determined by the time required for the valley point to travel from point J upwardly to a point at which the emitter load line L no longer intersects the high current positive resistance portion of the curve N. The time required for this is equal to the time interval $t_1-t_2$ or the time required for the capacitor to charge from the point F to point G. As ambient temperature affects the alpha of transistors T1 and T2, it is obvious that variations in temperature also result in the variation of the effective alpha of the composite arrangement to affect output pulse duration.

At this time when the effective alpha has been reduced to a point at which regeneration cannot be maintained, the transistor T2 becomes reverse biased and the trailing edge of the output pulse is determined. The diode 15 at this time due to the high back impedance presented to the discharge current of the capacitor 17 effectively isolates the capacitor from the circuit parameters. If the diode 15 were omitted, normal variations in emitter leakage current from transistor T2 would result in a modification of the discharge time constant of the capacitor 17. However, the diode 15 places upon the circuit an effective open-circuited condition in this current path. It is well known that the effect of temperature upon a resistance element, e.g. resistor 18, is less than that effect which is had upon semiconductor devices. Accordingly, as the capacitor 17 is made to discharge only through the resistor 18, ambient temperatures have a very small or negligible effect upon the discharge time constant thereof. Moreover, as the impedance in the emitter circuit of the transistor T2 is increased by the value of the back impedance of the diode 15, more current will be directed through the resistor 14 and less to the base electrode 6 of the transistor T2. The back impedance of the diode 15 insures that the transistor T2 will remain nonconductive even if the collector leakage current from the transistor T1 is increased by temperature variations.

The astable multivibrator circuit which has been described above is particularly suited for long periods of unattended operation at a remote location as the operation thereof is relatively independent of transistor parameters and variations in supply voltages. By providing for the isolation of the interpulse timing network from transistor parameters during the interpulse interval, the duty cycle of the astable circuit can be maintained within closer limits than has heretofore been possible. Moreover, the duty cycle of the astable circuit is further stabilized by providing that the voltages supplied to the timing network and the base electrode 6 be made to track with each other so that the transistor T2 is forward biased at the same fraction of the discharge time constant of control capacitor 17. The astable circuit which has been described is not susceptible to those conditions which normally affect the duty cycle of such circuits when operated at remote locations, e.g. variations in supply voltages, ambient temperatures, etc.

It is to be understood that the above-described arrangements are illustrative of the application of the principles of the invention. Numerous other arrangements may be devised by those skilled in the art without departing from the spirit and scope of the invention.

What is claimed is:

1. A pulse generator having an "on" and an "off" condition and comprising a pair of transistors of opposite conductivity types, each of said transistors having an emitter, a base and a collector, means for connecting said base of each of said transistors to said collector of the other of said transistors, impedance means connected to said base of one of said transistors for providing with said pair of transistors a negative resistance input characteristic, and a circuit arrangement including capacitive means connected between a point of fixed reference potential and said emitter of the other of said transistors to control the duration of said "on" condition, said arrangement also including isolation means responsive to said capacitive means and connected between said capacitive means and said emitter of said other of said transistors for isolating said capacitive means from said emitter of said other of said transistors during said "off" condition.

2. A transistor multivibrator circuit comprising a first transistor having a first emitter, a first collector, and a first base electrode, a second transistor of opposite conductivity type having a second emitter, a second collector, and a second base electrode, said first base electrode being electrically integral with said second collector electrode, a feedback promoting impedance connected to said first base electrode and said second collector electrode, bias means connected to said first emitter electrode, a first resistor connected to said second base electrode, second bias means connected to said first resistor, a unilateral conducting device and a second resistor connected in series to said second emitter, a capacitive device connected between said series connected unilateral conducting device and second resistor and said first resistor, a third resistor connected in series with said unilateral conducting device and said second resistor, and third bias means connected to said third resistor, said unilateral conducting device being poled to be in its low impedance condition during conduction through said second transistor to charge said capacitive device and to be in its high impedance condition on cessation of conduction through said second transistor due to the charge on said capacitive device, said capacitive device then discharging through said third resistor.

3. In a pulse generating circuit, a first junction transistor having a first emitter, a first collector and a first base, a second junction transistor having a second emitter, a second collector and a second base, said first collector being electrically integral with said second base, said second collector being electrically integral with said first base, first, second and third sources of reference potential, feedback promoting impedance means connecting said first base and said first source of reference potential, biasing means connected to said first emitter, and interpulse timing network means including a timing capacitor and a charging path for said timing capacitor, said path including a unilateral conducting device connecting one side of said timing capacitor to said second emitter and means connecting the other side of said timing capacitor to said second source of reference potential, said unilateral device being so arranged as to present a high impedance condition when conduction through said second transistor ceases due to the charging of said capacitive device; and means connecting a point intermediate said unilateral device and said timing capacitor to said third source of refence potential for discharging said timing capacitor.

4. In a pulse generator having an "off" and "on" condition and comprising a first and a second transistor of opposite conductivity type, each of said transistors having an emitter, a base, and a collector electrode, means connecting said base electrode of each of said first and said second transistors to said collector electrode of the other of said first and said second transistors, a first, second and third source of a reference potential, impedance means connecting said base electrode of said first transistor to said first source of reference potential and operative with said first and said second transistors to provide a negative resistance input characteristic, biasing means connected to said emitter electrode of said first transistor, output means connected to said collector electrode of said first transistor, a capacitive device, a charging path including a unilateral conducting device connecting said capacitive device to said emitter electrode of said second transistor and the other side of said capacitive device to said second source of reference potential, and means connecting the junction of said unilateral device and said capacitive device to said third source of reference potential for discharging said capacitive device, said unilateral device being poled so as to isolate said discharging means from said pulse generator during said "off" condition.

5. In a pulse generator, a first and a second transistor of opposite conductivity types, each of said transistors having a base electrode, an emitter electrode, and a collector electrode, means connecting said base electrode of each of said transistors to said collector electrode of the other of said transistors, biasing means connected to said emitter electrode of said first transistor, a source of reference potential, impedance means connecting said base electrode of said first transistor to said source of reference potential and providing with said first and said second transistors for a negative resistance input characteristic, and timing means connected between said base and said emitter electrodes of said second transistor, said timing means including a capacitor and a unilateral conducting device connected in series, said unilateral device being poled in a direction of emitter current flow through said second transistor, first voltage means for biasing the junction of said capacitor and said unilateral device, and second voltage means for biasing the junction of the other side of said capacitor and said base electrode of said second transistor, said first voltage means being of larger magnitude than said second voltage means whereby said second transistor is normally forward biased.

6. In a multivibrator, a first and a second transistor of opposite conductivity type, each of said first and said second transistors having an emitter, a base and a collector electrode, said base electrode of each of said first and said second transistors being electrically integral with said collector electrode of the other of said first and said second transistors, a source of reference potential, impedance means connecting said base electrode of said first transistor to said source of reference potential and providing with said first and said second transistors for a negative resistance input characteristic, biasing means connected to said emitter electrode of said first transistor, a voltage source, a first voltage divider having a voltage tap and connected between said voltage source and said source of reference potential, a second voltage divider having a voltage tap and connected between said voltage tap of said first divider and said source of reference potential, said voltage tap of said second divider being connected to said base electrode of said second transistor, means connecting said voltage source to said emitter electrode of said second transistor, said connecting means including a unilateral conducting device poled to present a low impedance condition upon condition in said second transistor and an impedance element, and a control capacitor connected between said voltage tap of said first divider and said unilateral device, said impedance element being connected between said voltage source and said control capacitor.

7. In a pulse generating circuit, a first transistor having a first emitter, a first collector and a first base, a second transistor having a second emitter, a second collector and a second base, said first collector being electrically integral with said second base, said second collector being electrically integral with said first base, a source of reference potential, feedback promoting impedance means connected between said first base and said source of reference potential, and external circuit means connected between said second emitter and said second base, said external circuit means including a unilateral conducting device and a timing capacitor, a source of fixed potential, said timing capacitor being connected between said source of fixed potential and said second emitter for controlling the conductive state of said second transistor, said unilateral device being poled to present a low impedance condition upon conduction in said second transistor and interposed between said second emitter and said timing capacitor, means for providing a first voltage to said second base, and a discharge circuit for said timing capacitor connected to a point intermediate said timing capacitor and said unilateral device and including means for providing a second voltage of greater magnitude than said first voltage, said first and second voltages being operative to normally forward bias the base-emitter junction of said second transistor.

8. In a pulse generating circuit, a first transistor having a first emitter, a first collector and a first base electrode, a second transistor of opposite conductivity having a second emitter, a second base and a second collector electrode, said first base electrode being electrically integral with said second collector electrode, said second base electrode being electrically integral with said first collector electrode, first, second and third sources of reference potentials, feedback promoting impedance means connecting the junction of said first base electrode and said second collector electrode to said first source of reference potential, biasing means connected to said first emitter electrode, a charging path having a capacitive timing device connected between said second source of reference potential and said second emitter electrode, said charging path including a unilateral conducting device interposed between said capacitive device and said second emitter electrode and poled to present a low impedance condition upon conduction in said second transistor, and means connected between said capacitive timing device and said third source of reference potential for discharging said capacitive device on reverse biasing of said unilateral device upon conduction through said second transistor ceasing due to the charging of said capacitive device.

9. A pulse generator in accordance with claim 5 further including means for causing the magnitudes of said first voltage means and said second voltage means to vary equal percentages responsive to variations of voltage in said first voltage means to maintain the discharge time of said capacitor constant independent of said variations.

References Cited in the file of this patent

UNITED STATES PATENTS

| | | |
|---|---|---|
| 2,655,609 | Shockley | Oct. 13, 1953 |
| 2,770,732 | Chong | Nov. 13, 1956 |
| 2,816,230 | Lindsay | Dec. 10, 1957 |
| 2,845,548 | Silliman | July 25, 1958 |
| 2,864,985 | Beck | Dec. 16, 1958 |
| 2,885,550 | Rongen | May 5, 1959 |
| 2,894,210 | Erb | July 7, 1959 |
| 2,900,606 | Faulkner | Aug. 18, 1959 |